(12) United States Patent
Chaudhari et al.

(10) Patent No.: US 11,960,952 B2
(45) Date of Patent: Apr. 16, 2024

(54) HARDWARE ALLOCATION IN RFIC BASED ON MACHINE LEARNING

(71) Applicant: Samsung Electronics Co., Ltd., Suwon-si (KR)

(72) Inventors: Shailesh Chaudhari, San Diego, CA (US); Hyukjoon Kwon, San Diego, CA (US); Kee-Bong Song, San Diego, CA (US); Dongwoon Bai, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 17/834,845

(22) Filed: Jun. 7, 2022

(65) Prior Publication Data

US 2023/0297803 A1    Sep. 21, 2023

Related U.S. Application Data

(60) Provisional application No. 63/253,392, filed on Oct. 7, 2021.

(51) Int. Cl.
*G06K 19/06* (2006.01)
*G06K 19/07* (2006.01)
*G06N 3/08* (2023.01)

(52) U.S. Cl.
CPC ........... *G06K 19/0723* (2013.01); *G06N 3/08* (2013.01)

(58) Field of Classification Search
CPC ...... G06K 19/0723; G06N 3/08; G06N 3/084; G06N 3/092; G06N 5/01; G06N 3/04; G06N 3/045; G06N 20/00; H04B 1/3833; H04B 1/401; H04W 88/06

See application file for complete search history.

(56) References Cited

U.S. PATENT DOCUMENTS

| | | |
|---|---|---|
| 9,236,979 B2 | 1/2016 | Park et al. |
| 10,907,940 B1 | 2/2021 | Parker et al. |
| 2004/0181497 A1* | 9/2004 | Dodgson ................. H04L 27/20 706/23 |
| 2007/0211786 A1 | 9/2007 | Shattil |

(Continued)

FOREIGN PATENT DOCUMENTS

WO    WO 00/35222 A1    6/2000

OTHER PUBLICATIONS

Browne, C. B. et al., "A Survey of Monte Carlo Tree Search Methods", IEEE Transactions on Computational Intelligence and AI in Games, Mar. 2012, pp. 1-43, vol. 4, No. 1, IEEE.

*Primary Examiner* — Jamara A Franklin
(74) *Attorney, Agent, or Firm* — Lewis Roca Rothgerber Christie LLP

(57) ABSTRACT

A system and method for configuring an RF network based on machine learning. In some embodiments, the method includes: receiving, by a first neural network, a first state and a first state transition, the first state including: one or more identifiers for available active ports, and a set of available connections between two or more circuit elements, each of the circuit elements being one of: (1) a first circuit type, (2) a second circuit type that operatively connects a circuit element of the first circuit type to one of the available active ports, and (3) the available active ports; and generating, by the first neural network, a first estimated quality value, for the first state transition.

20 Claims, 5 Drawing Sheets

(56) References Cited

U.S. PATENT DOCUMENTS

2009/0286540 A1 11/2009 Huber et al.
2015/0133067 A1 5/2015 Chang et al.
2017/0353991 A1 12/2017 Tapia

* cited by examiner

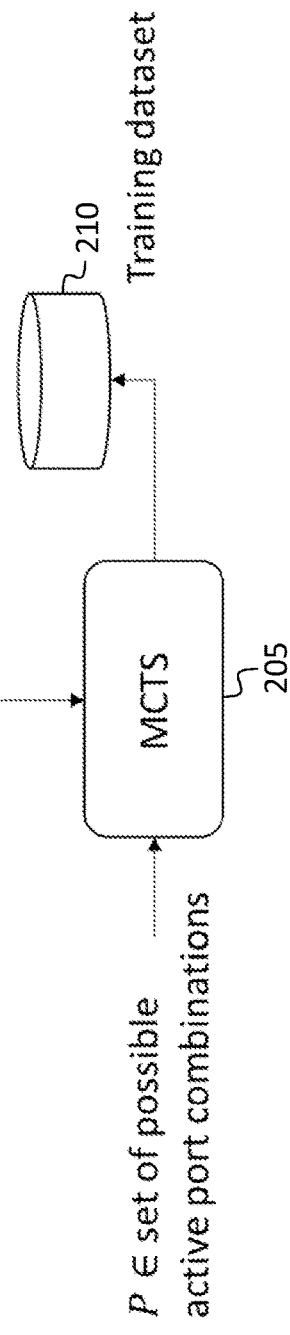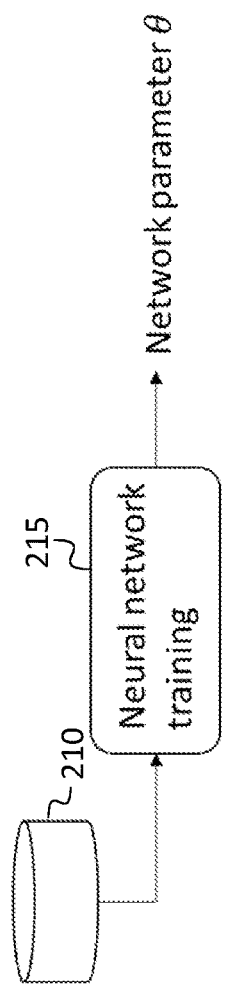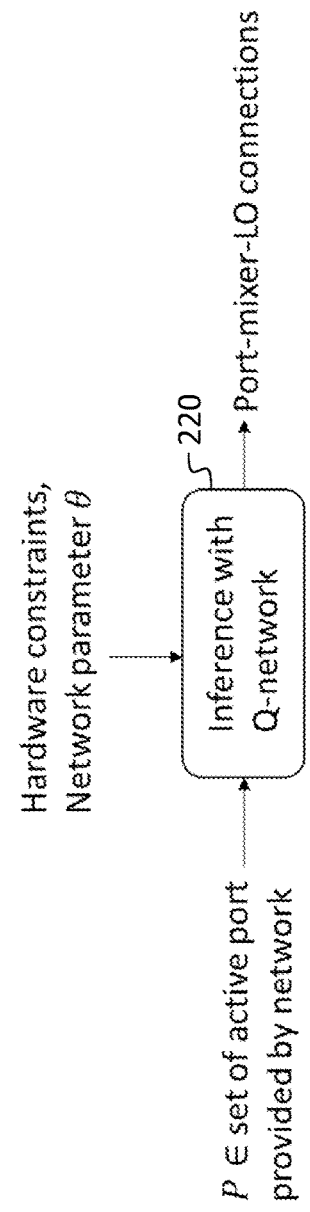
FIG. 2A
FIG. 2B
FIG. 2C

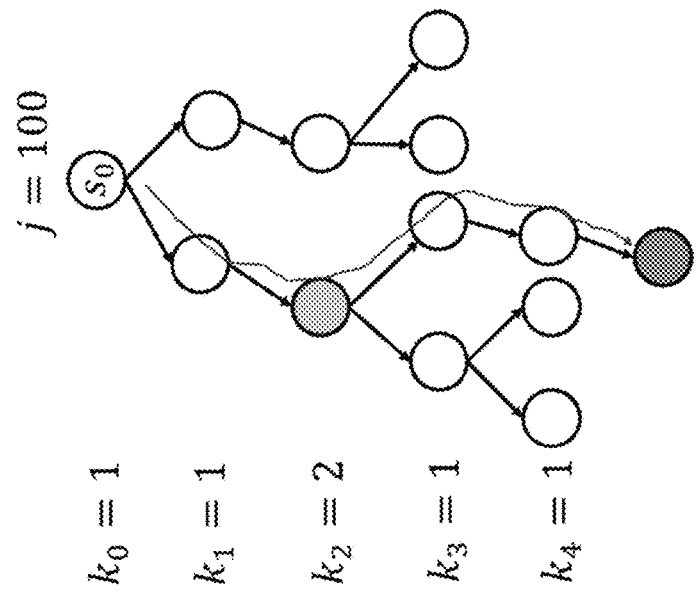
FIG. 3A
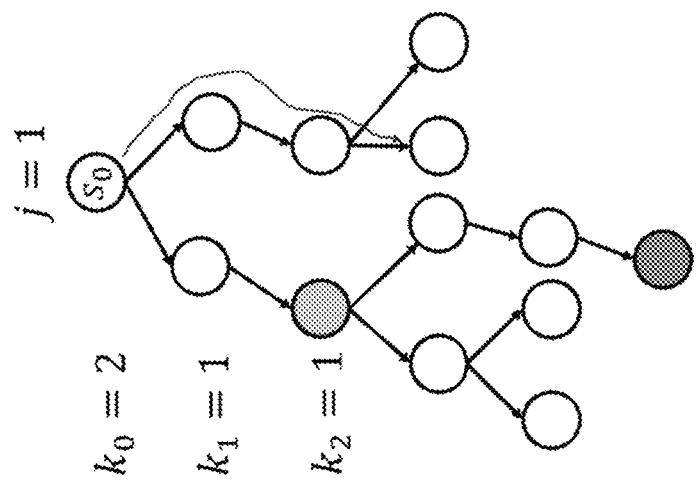
FIG. 3B
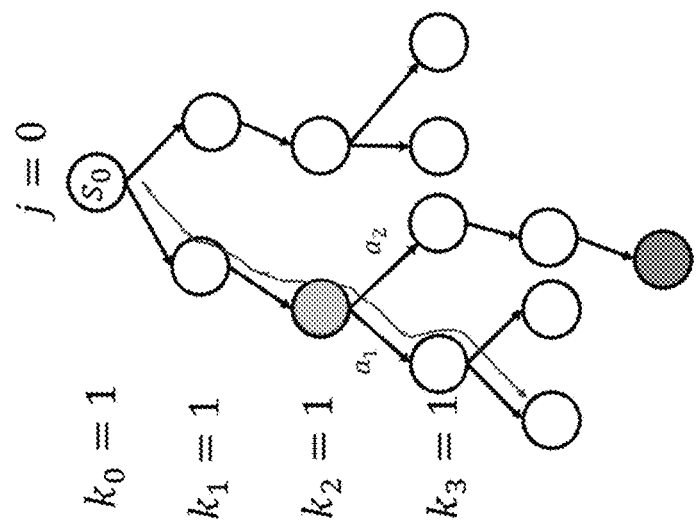
FIG. 3C
FIG. 3D
⟶ Path traversed by the algorithm
● Successful terminal state
● State at which $\hat{Q}(s,a) \neq Q(s,a)$

HARDWARE ALLOCATION IN RFIC BASED ON MACHINE LEARNING

CROSS-REFERENCE TO RELATED APPLICATION(S)

The present application claims priority to and the benefit of U.S. Provisional Application No. 63/253,392, filed Oct. 7, 2021, entitled "PORT ALLOCATION FOR CARRIER AGGREGATION AND MIMO BASED ON MACHINE LEARNING", the entire content of which is incorporated herein by reference.

FIELD

One or more aspects of embodiments according to the present disclosure relate to configuring of a radio frequency (RF) circuit, and more particularly to a system and method for using machine learning to configure a radio frequency circuit in a User Equipment.

BACKGROUND

A User Equipment (UE) operating as part of a wireless network may on occasion receive configuration instruction from a network node, instructing the User Equipment to operate within certain bands, in a Carrier Aggregation mode or in a Multiple-Input, Multiple-Output (MIMO) mode. To comply with such instructions, the UE may configure a radio frequency integrated circuit (RFIC) by making connections, within the RFIC, between local oscillators of the RFIC and mixers of the RFIC, and between the mixers and active ports of the RFIC. However, not all connections may be available to be made; for example, it may not be possible to connect certain local oscillators to certain mixers, or to connect certain mixers to certain active ports.

It is with respect to this general technical environment that aspects of the present disclosure are related.

SUMMARY

According to an embodiment of the present disclosure, there is provided a method, including: receiving, by a first neural network, a first state and a first state transition, the first state including: one or more identifiers for available active ports, and a set of available connections between two or more circuit elements, each of the circuit elements being one of: (1) a first circuit type, (2) a second circuit type that operatively connects a circuit element of the first circuit type to one of the available active ports, and (3) the available active ports; and generating, by the first neural network, a first estimated quality value, for the first state transition, the first estimated quality value corresponding to a likelihood of the first state transition being one of a sequence of transitions terminating in a terminal state in which a connection is made to each of the available active ports, wherein: the first state transition is a transition from the first state to a second state, and the second state includes a connection, not present in the first state, between two of the circuit elements.

In some embodiments, the method further includes: feeding, to the first neural network, the first state and the first state transition; receiving, from the first neural network, the first estimated quality value; feeding, to the first neural network, the first state and a second state transition; and receiving from the first neural network, a second estimated quality value, the second estimated quality value corresponding to a likelihood of the second state transition being one of a sequence of transitions terminating in a terminal state in which a connection is made to each of the available active ports, wherein the second state transition is a transition from the first state to a third state, the third state including a connection, not present in the first state, and not present in the second state, between two of the circuit elements.

In some embodiments, the method further includes determining that the second estimated quality value is greater than the first estimated quality value.

In some embodiments, the method further includes, in response to determining that the second estimated quality value is greater than the first estimated quality value, feeding to the first neural network, the third state and a third state transition, wherein the third state transition is a transition from the third state to a fourth state, the fourth state including a connection, not present in the third state, between two of the circuit elements.

In some embodiments, the method further includes feeding to the first neural network, the second state and a fourth state transition, wherein: the fourth state transition is a transition from the second state to a fifth state, and the fifth state includes a connection, not present in the second state, between two of the circuit elements.

In some embodiments, the first circuit type is a local oscillator and the second circuit type is a mixer, and wherein the first estimated quality value further corresponds to a likelihood of the first state transition being one of a sequence of transitions terminating in a terminal state in which a connection is made to each of the available active ports and in which two respective connections are made, from a local oscillator to two mixers.

In some embodiments, the method further includes performing a feasibility test, to check for an indication that no terminal state in which a connection is made to each of the available active ports can be reached from the first state.

In some embodiments, a number of circuit elements of the first circuit type are available and a number of circuit elements of the second circuit type are available, and the feasibility test is based on the number of available circuit elements of the first circuit type and the number of available circuit elements of the second circuit type.

In some embodiments, the method further includes: generating a training data set using a Monte-Carlo tree search to assign a quality value to each of a plurality of combinations of states and state transitions; training a training neural network using the training data set, to generate a network parameter set; and storing the network parameter set in the first neural network.

According to an embodiment of the present disclosure, there is provided a User Equipment, including: a processing circuit; and memory connected to the processing circuit, the memory storing instructions that, when executed by the processing circuit, cause the User Equipment to perform a method, the method including: receiving, by a first neural network, a first state and a first state transition, the first state including: one or more identifiers for available active ports, and a set of available connections between two or more circuit elements, each of the circuit elements being one of: (1) a first circuit type, (2) a second circuit type that operatively connects a circuit element of the first circuit type to one of the available active ports, and (3) the available active ports; and generating, by the first neural network, a first estimated quality value, for the first state transition, the first estimated quality value corresponding to a likelihood of the first state transition being one of a sequence of transitions terminating in a terminal state in which a connection is made to each of the available active ports, wherein: the first state transition is a transition from the first state to a second state, and the second state includes a connection, not present in the first state, between two of the circuit elements.

In some embodiments, the method further includes: feeding, to the first neural network, the first state and the first state transition; receiving, from the first neural network, the first estimated quality value; feeding, to the first neural network, the first state and a second state transition; and receiving from the first neural network, a second estimated quality value, the second estimated quality value corresponding to a likelihood of the second state transition being one of a sequence of transitions terminating in a terminal state in which a connection is made to each of the available active ports, wherein the second state transition is a transition from the first state to a third state, the third state including a connection, not present in the first state, and not present in the second state, between two of the circuit elements.

In some embodiments, the method further includes determining that the second estimated quality value is greater than the first estimated quality value.

In some embodiments, the method further includes, in response to determining that the second estimated quality value is greater than the first estimated quality value, feeding to the first neural network, the third state and a third state transition, wherein the third state transition is a transition from the third state to a fourth state, the fourth state including a connection, not present in the third state, between two of the circuit elements.

In some embodiments, the method further includes feeding to the first neural network, the second state and a fourth state transition, wherein: the fourth state transition is a transition from the second state to a fifth state, and the fifth state includes a connection, not present in the second state, between two of the circuit elements.

In some embodiments, the first circuit type is a local oscillator and the second circuit type is a mixer, and wherein the first estimated quality value further corresponds to a likelihood of the first state transition being one of a sequence of transitions terminating in a terminal state in which a connection is made to each of the available active ports and in which two respective connections are made, from a local oscillator to two mixers.

In some embodiments, the method further includes performing a feasibility test, to check for an indication that no terminal state in which a connection is made to each of the available active ports can be reached from the first state.

In some embodiments, a number of circuit elements of the first circuit type are available and a number of circuit elements of the second circuit type are available, and the feasibility test is based on the number of available circuit elements of the first circuit type and the number of available circuit elements of the second circuit type.

In some embodiments, the method further includes: generating a training data set using a Monte-Carlo tree search to assign a quality value to each of a plurality of combinations of states and state transitions; training a training neural network using the training data set, to generate a network parameter set; and storing the network parameter set in the first neural network.

According to an embodiment of the present disclosure, there is provided a User Equipment, including: means for processing; and memory connected to the means for processing, the memory storing instructions that, when executed by the means for processing, cause the User Equipment to perform a method, the method including: receiving, by a first neural network, a first state and a first state transition, the first state including: one or more identifiers for available active ports, and a set of available connections between two or more circuit elements, each of the circuit elements being one of: (1) a first circuit type, (2) a second circuit type that operatively connects a circuit element of the first circuit type to one of the available active ports, and (3) the available active ports; and generating, by the first neural network, a first estimated quality value, for the first state transition, the first estimated quality value corresponding to a likelihood of the first state transition being one of a sequence of transitions terminating in a terminal state in which a connection is made to each of the available active ports, wherein: the first state transition is a transition from the first state to a second state, and the second state includes a connection, not present in the first state, between two of the circuit elements.

In some embodiments, the method further includes: feeding, to the first neural network, the first state and the first state transition; receiving, from the first neural network, the first estimated quality value; feeding, to the first neural network, the first state and a second state transition; and receiving from the first neural network, a second estimated quality value, the second estimated quality value corresponding to a likelihood of the second state transition being one of a sequence of transitions terminating in a terminal state in which a connection is made to each of the available active ports, wherein the second state transition is a transition from the first state to a third state, the third state including a connection, not present in the first state, and not present in the second state, between two of the circuit elements.

BRIEF DESCRIPTION OF THE DRAWINGS

These and other features and advantages of the present disclosure will be appreciated and understood with reference to the specification, claims, and appended drawings wherein:

FIG. 2A is a data flow diagram, according to an embodiment of the present disclosure;

FIG. 2B is a data flow diagram, according to an embodiment of the present disclosure;

FIG. 2C is a data flow diagram, according to an embodiment of the present disclosure;

FIG. 3A is a state tree traversal diagram, according to an embodiment of the present disclosure;

FIG. 3B is a state tree traversal diagram, according to an embodiment of the present disclosure;

FIG. 3C is a state tree traversal diagram, according to an embodiment of the present disclosure;

FIG. 3D is a legend for FIGS. 3A-3C, according to an embodiment of the present disclosure;

DETAILED DESCRIPTION

The detailed description set forth below in connection with the appended drawings is intended as a description of exemplary embodiments of a system and method for configuring an RF network based on machine learning provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
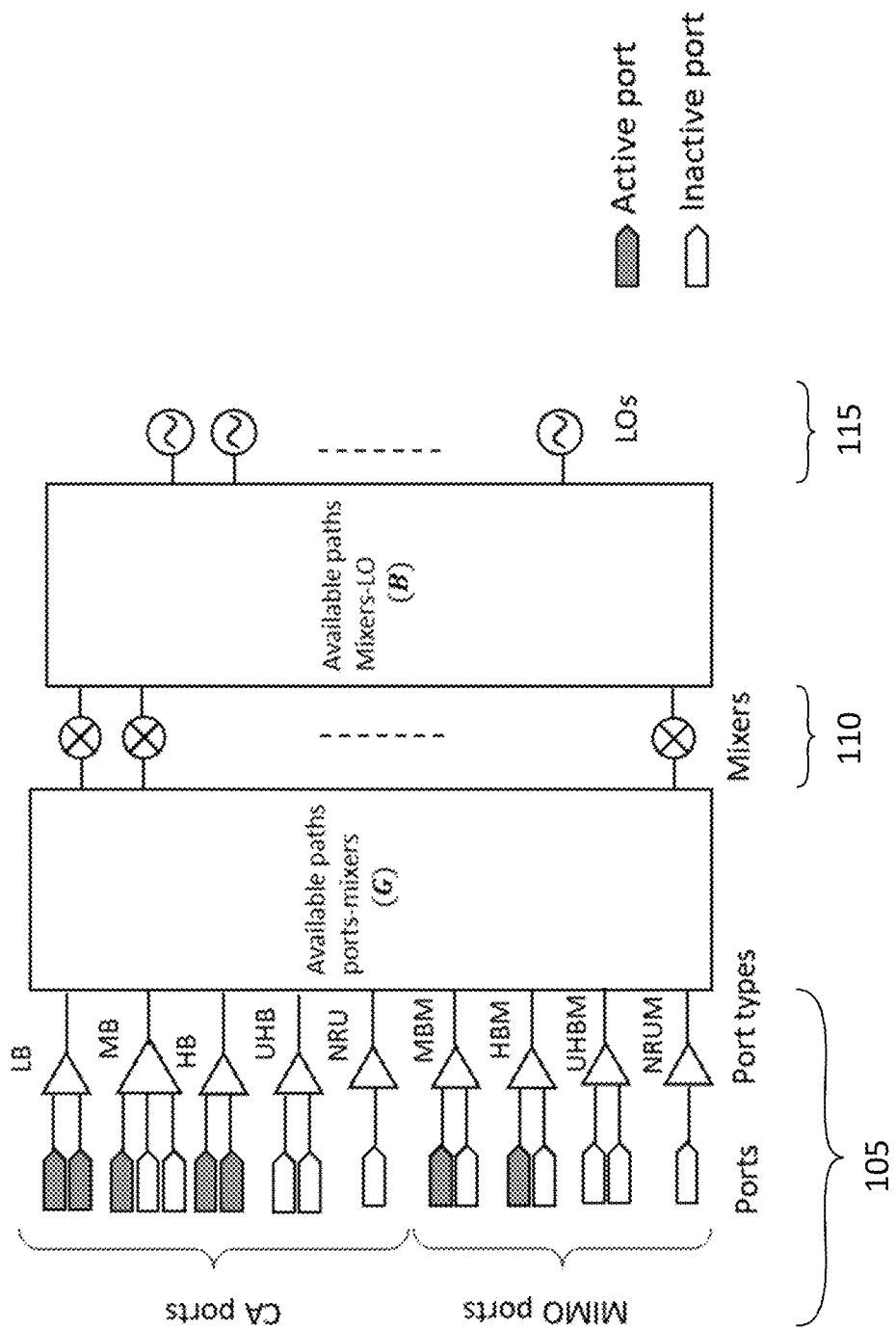
FIG. 1 is a block diagram of a portion of a radio frequency integrated circuit (RFIC), according to an embodiment of the present disclosure.

FIG. 1 is a schematic drawing of a portion of a radio frequency (RF) integrated circuit (RFIC), which may be part of a User Equipment in a wireless (e.g., Fifth Generation (5G)) communication system. Carrier aggregation (CA) and MIMO techniques may be used in wireless networks to increase a user's data rate by allocating multiple frequency blocks to the same user. A signal in multiple frequency blocks may be received on different ports 105 of the RFIC of the user equipment (UE). The active ports may be allocated to the UE by the network (e.g., by a network node (gNB)). In the RFIC, each active port may be assigned a mixer 110 and a local oscillator (LO) 115 in order to demodulate and decode the signal. In order to simplify the RFIC's hardware, the possible connecting paths between ports and mixers and between mixers and LOs are limited. Therefore, it may be the case that any given port cannot be connected to all mixers and any given mixer cannot be connected to all LOs. Due to such restrictions, the assigning of mixers and LOs to active ports may not be simple. As used herein, an "element" (except when referring to an element of a vector) is an active port, or a mixer, or a local oscillator, and, as such, the configuring of the RFIC in response to active ports being allocated to the UE involves making one or more connections between elements.

Some methods for assigning mixers and LOs to active ports involve manually updating the connection tables. In some embodiments, a machine learning based method is instead used to automate the assignment, using a neural network. Once the RFIC's hardware design is finalized, the method may be used to train a neural network in order to find mixer and LO assignment for each active port at run-time. Referring to FIGS. 2A-2C, in some embodiments, connections may be selected in an RFIC using (i) reinforcement learning with a Monte-Carlo tree search (MCTS) (FIG. 2A, in which the MCTS 205 is used to generate a training dataset 210), (ii) neural network training (FIG. 2B, in which the training dataset 210 is used to perform, at 215, neural network training, to generate a network parameter set θ), and (iii) online inferencing (FIG. 2C, in which a trained neural network 220 is used to generate recommendations for connections to be made, e.g., for a mixer and LO assignment for each of the active ports).

A system model and objective may be defined as follows. Let $\mathcal{P}$ be the set of available port types (bands) at the UE with a total of $N_a$ available port types. For example, $\mathcal{P}_a$ may have $N_a=9$ port types as follows:

$$\mathcal{P}_a = \{1:LB, 2:MB, 3:HB, 4:UHB, 5:NRU, 6:MBM, 7:HBM, 8:UHBM, 9:NRUM\} \quad (1)$$

where LB is Low Band, MB is mid band, HB is high band, UHB is ultra-high band, and NRU is new radio unlicensed, and the letter M in ports 6, 7, 8, 9 stands for MIMO. Thus, in the above list ports 1-5 are CA ports and ports 6-9 are MIMO ports. The RFIC includes M mixers and L LOs. The hardware constraints depend on the RFIC design. The constraints may be described in terms of two matrices, G and B. G is an a $N_a \times M$ matrix, where M is the number of mixers.

The matrix G indicates whether or not there is a path between port type n to mixer m. For example, the entries of G may be interpreted as follows:

If $G(n,m)=0$, then there is *no* path from port $n$ to mixer $m$, $n \in \{1,2,\ldots,N_Q\}, m \in \{1,2,\ldots,M\}$ If $G(n,m)=1$, then there is *a* path from port $n$ to mixer $m$, $n \in \{1,2,\ldots,N_Q\}, m \in \{1,2,\ldots,M\}$ (2)

Similarly, B is an M×L binary matrix indicating whether or not there is a path between mixer m and LO l (where L is the number of local oscillators):

If $B(m,1)=1$, then there is *a* path from mixer $m$ to LO $l$

If $B(m,1)=0$, then there is *no* path from mixer $m$ to LO $l$ (3)

Depending on the RFIC design, there may be more or fewer hardware constraints.

The list of active ports $\mathcal{P}$ is allocated by the network to the UE from the list in Equation (1). The ports in P may be repeated; for example, $\mathcal{P}$ may be as follows:

$$\mathcal{P} = \{LB, LB, MB, HB, HB, MBM, HBM\} = \{1,1,2,3,3,6,7\} \quad (4)$$

The number of active ports in $\mathcal{P}$ is N. In the above example, N=7. $N_{CA}$ may be defined to be the number of CA ports in $\mathcal{P}$ and $N_{MIMO}$ may be defined to be the number of MIMO ports in $\mathcal{P}$. For the example in equation (4), $N_{CA}=5$, $N_{MIMO}=2$.

X and Y may be defined to be binary matrices of size N×M and M×L, respectively, indicating connections between port $\mathcal{P}\{i\}$ to mixer m and mixer m to LO l, where $i=1,2,3,\ldots N$ and $\mathcal{P}\{i\}$ is the ith entry in the list $\mathcal{P}$.

The objective may be to find a mixer assignment and an LO assignment for each of the ports in P, while minimizing the number of LOs used. The constraints are as follows:

Constraint 1: Constraints imposed by G, B in Equations (2) and (3)

Constraint 2: One mixer can be connected to only one port and one port can be connected to only one mixer.

Constraint 3: A mixer connected to a port must be connected to an LO.

Constraint 4: One LO can be connected to only one mixer, and one mixer can be connected to only one LO, with the exception that the same LO can be used for CA and MIMO ports of the same band, e.g., MB and MBM can be connected to same LO via different mixers.

Alternatively, the objective may be stated as finding mixer and LO assignments for all of the ports in P, while maximizing the number of LOs shared between CA and MIMO ports. Mathematically, the optimization problem may be stated as follows. The objective function may be the following:

$$\text{Max}_{X,Y} 1(\|X\|_F^2 = N)(1 + S_L) \quad (5)$$

where (i) $\|X\|_F^2 = \Sigma_i \Sigma_j |X|^2$ is the square of the Frobenius norm of X, which is equal to the number of ports connected, (ii) $1(\|X\|_F^2=N)$ is an indicator function, which is equal 1 if $\|X\|_F^2=N$ i.e., ports connected, and which is equal to 0 otherwise, and (iii) $S_L$ is the number of LOs shared between CA and MIMO ports.

The constraints of the problem may be stated as follows:

C1: Binary entries $X_{n,m} \in \{0,1\}, Y_{m,l} \in \{0,1\}, \forall n,m,l$ (6)

C2: X, Y follow connection restrictions *set* by A and B (7)×

$X \odot A = X$, where $\odot$ denotes element-wise multiplication $Y \odot B = Y$ where $$A = \begin{bmatrix} a_1^T \\ \vdots \\ a_N^T \end{bmatrix}$$

Where $a_n^T$, n=1, 2, . . . , N, is the $\mathcal{P}$ {n}-th row of the matrix G.

C3: Each port mapped to one mixer $\sum_m X_{n,m} \leq 1$, for $n=1,2,\ldots,N$ (8)

C4: Each mixer mapped to at most one port $\sum_n X_{n,m} \leq 1$, for $m=1,2,\ldots,M$ (9)

C5: Mixer m is connected to one LO in Y if mixer m is connected to any port in X $\sum_l Y_{m,l} = \sum_n X_{n,m}$ for $m=1,2,\ldots,M$ (10)

C6: LO sharing constraint $\text{rank}(Y) = \|X\|_F^2 - S_L$ (11)

where $0 \leq S_L \leq N_{MIMO}$

A solution may be obtained by iteratively connecting a one port at a time to a mixer and an LO, with the ultimate goal of obtaining valid connections for all the active ports to mixers and LOs. This approach may be described as a Markov Decision Process (MDP) where:

The state s includes {set of unconnected ports, available port-mixer connections, available mixer-LO connection}

$\mathcal{A}$ (s) is the set of valid actions in state s.

A valid action $a \in \mathcal{A}$ (s) indicates {unconnected port index n, mixer index m, LO index l}. Taking the action a means connecting port n to mixer m and mixer m to LO l. This is equivalent to setting $X_{n,m}=1$ and $Y_{m,l}=1$.

When action a is taken in state s, the MDP moves to (makes a state transition to) state s'.

Q(s, a) is the long term reward associated with taking action $a \in \mathcal{A}$ (s) from state s, or, equivalently the long term reward associated with the state s'.

$s_T$ is a terminal state such that $\mathcal{A}$ $(s_T) = \phi$ (where $\phi$ is the empty set), i.e., no valid actions are possible.

The reward $\Delta$ is returned at the terminal state.

The reward is back-propagated in the tree from the terminal state to the initial state $s_0$ and Q(s, a) are updated.

Each action corresponds to a state transition, and, as used herein, "action" and "state transition" are synonymous. Once the values of $Q(s_i, a)$ have been determined, then, starting from the initial state $s_0$, the action $a^*_i$ may be selected at each step (i.e., at each intermediate state) such that $a^*_i = \text{argmax}_{a \in A(s_i)} Q(s_i, a)$ for i=0, 1, 2, . . . to reach a terminal state $s_T$. In the Monte Carlo process, at each state, if no paths (actions) have been explored before the current iteration, then an action is selected randomly. Otherwise, a path (an action) is selected based on the Q value accumulated before the current iteration with some probability of random selection. $Q(s_i, a)$ is an estimate computed by the Monte Carlo process. If the Monte Carlo were to run for an infinite number of iterations, the estimated Q value may be expected to converge to a 'true' value of $Q(s_i, a)$. In some embodiments, Q(s, a) is obtained such that the reward at the terminal state $s_T$ is maximized and all ports are connected in $s_T$. As mentioned above, in some embodiments, three principal operations are employed to accomplish this goal (i) reinforcement learning, which may be employed to learn the Q values Q(s, a) of different state-action pairs using Monte-Carlo Tree Search (MCTS), (ii) reward computation and back-propagation during the tree search to enable a connection search, and (iii) a connection search algorithm to find mixer and LO assignment for each one of the active ports.

A feasibility test may be employed to assess whether, for a given set of constraints and active ports, a solution (in which each active port is connected to a mixer which is connected to an LO) exists. Four infeasibility conditions, based on $\mathcal{P}$, A may be defined. If any one of the conditions is satisfied, then it is infeasible to connect all ports to mixers, i.e., no terminal state in which a connection is made to each of the available active ports can be reached from the first state. These conditions are sufficient, but not necessary, to prove infeasibility. If any of them is satisfied, then it is not possible to connect all of the active ports to mixers. If none of them is satisfied, then it may or may not be possible to connect all of the active ports to mixers.

Listing 1 is a pseudo-code listing for code that may be employed to check for infeasibility. In this listing, the following definitions are employed:

$A_{CA}$, $A_{MIMO}$ such that $$A = \begin{bmatrix} A_{CA} \\ A_{MIMO} \end{bmatrix} \quad (12)$$

where $A_{CA}$ are the first $N_{CA}$ rows of A and $A_{MIMO}$ are the last $N_{MIMO}$ rows of A.

Listing 1

1. If the number of ports, N, is greater than the number of available mixers, M, then infeasible (Condition 1)
2. If the number of active CA ports is greater than the number of mixers connected to those CA ports
   ($N_{CA}$ is greater than the number of non-zero columns in $A_{CA}$)
   OR
   if the number of active MIMO ports is greater than the number of mixers connected to those MIMO ports
   ($N_{MIMO}$ is greater than the number of non-zero columns in $A_{MIMO}$)
   then infeasible (Condition 2)
3. If the total number of active ports > the number of mixers connected to those active ports
   (N > the number of non-zero columns in A)
   then infeasible (Condition 3)
4. Set loop count i = 1, $A^{(i)} = A$,
5. $A^{(0)} = A$
6. WHILE (1)
   a. Count no. of times each port-mixer connection row is repeated in $A^{(i)}$ for the same port type.
      If number of repetitions > number of mixers it can connect to, then infeasible (Condition 4)
   b. If row repetitions in $A^{(i)}$ = no. of mixers, then those mixers cannot be assigned to other ports. update $A^{(i)}$ to remove connections between such mixers to other ports
   c. If any row (port) in $A^{(i)}$ has only one partial connection remaining, then convert it to full connection.
   d. IF $A^{(i)} == A^{(i-1)}$
      Break;
      ELSE
      Increment loop counter i
      $A^{(i)} = A^{(i-1)}$,
      ENDIF
7. ENDWHILE Reinforcement learning with Monte-Carlo tree search (MCTS) may be performed as follows. From the given port combination $\mathcal{P}$, an initial state or root node $s_0$ may be constructed. Starting from the initial state, a tree is constructed by taking actions until a terminal state is reached, computing and backing up the reward, and computing Q values. At each state or node, a record is kept of the number of times each action is taken and of the corresponding Q value for each state-action pair. As mentioned above, the objective of reinforcement learning with MCTS is to learn a Q value for each state-action pair.

State transitions may occur as follows, in the MCTS algorithm. Initial connection matrices may be defined as $G_0=G$, $B_0=B$. $\mathcal{P}_0=\mathcal{P}$ may be the initial list of ports remaining to be connected and $X_0=0$, $Y_0=0$ may be the initial connection matrices. Each state may be defined as the tuple $s_i=\{\mathcal{P}_i, G_i, B_i, X_i, Y_i\}$. In the state $s_i$, matrices $X_i$, $Y_i$ indicate the connections made from ports to mixers, and from mixers to Los, respectively. The matrix P, indicates the list of unconnected ports, and the matrices $G_i$, $B_i$ indicate the available port-mixer and mixer-LO connections.

$\mathcal{A}$ ($s_i$) may be the set of valid actions in state $s_i$, where a valid action is denoted by tuple $a=\{n, m, l\}\in\mathcal{A}$ ($s_i$). The action $\{n, m, l\}$ connects port n to mixer m and mixer m to LO l. For a valid action, the following holds:

If n is a CA port
  The mixer m is such that $G_i(n, m)\neq 0$.
  The LO l is such that $B_i(m, l)\neq 0$ and LO l is not connected to any other port.
If n is a MIMO port
  The CA of the same band has already been connected.
  The mixer m is such that $G_i(n, m)\neq 0$.
  The LO l is such that $B_i(m, l)\neq 0$ and LO l is not connected to any other port, except for a CA port of the same band.

When the action $\{n, m, l\}$ is taken from state s, the parameters are updated as follows.
  The connection matrices are updated as follows:
    $X_{i+1}=X_i$, $Y_{i+1}=Y_i$, $X_{i+1}(n, m)=1$, $Y_{i+1}(m, l)=1$
  The mixer and LO availability matrices are updated as follows:
    $G_{i+1}=G_i, B_{i+1}=B_i$,
    Mixer m is disconnected from other ports: $G_{i+1}(:, m)=0$,
    LO l is disconnected from mixer m: $B_i(m, l)=0$,
  Port n is removed from the list of unconnected ports:
    $\mathcal{P}_{i+1}=\mathcal{P}_i\setminus\{n\}$ In this way, a state transition from state $s_i$ to state $s_{i+1}=\{\mathcal{P}_{i+1}, G_{i+1}, B_{i+1}, X_{i+1}, Y_{i+1}\}$ takes place with action a. The number of times action a is taken from state s is denoted by N(s, a). This counter is updated during the state transition.

Q values: Q(s, a) may then be calculated for each state-action pair over the number of times N(s, a) that action a is taken from state s, as the total of the rewards $\Delta$ achieved in the terminal states reached from s' in the ensemble of Monte Carlo tests.

The algorithm involves selection, expansion, simulation, and back-propagation. These may be incorporated as shown in the algorithm of Listing 2. When the algorithm reaches a terminal state, the reward computation and back-propagation are implemented as described below.

Reward computation and back-propagation may be performed as follows. During back-propagation, a reward $\Delta$ is returned from the terminal state. Two methods, referred to herein as option-1 and option-2, may be used for reward computation.

In option-1, a non-zero reward is returned only when all active ports are connected to mixers and LOs (a reward of zero is returned if any port remains unconnected in the terminal state):

$$\Delta=1(\|X\|_F^2=N)(1+S_L) \quad (13)$$

In option-2, the terminal reward $\Delta$ is calculated as:

$$\Delta=I_1\times(\|X\|_F^2+S_L)+I_2\times 1(\|X\|_F^2=N) \quad (14)$$

where $I_1$ and $I_2$ are integers; the term $I_1\times(\|X\|_F^2+S_L)$ provides rewards for number of ports connected and number of LOs shared; the term $I_2\times 1(\|X\|_F^2=N)$ provides a bonus reward if all ports are connected. To emphasize the importance of connecting all ports over the number of connections and LOs shared, the integers $I_1$ and $I_2$ may be chosen to satisfy $I_2\geq I_1\times\max(\|X\|_F^2+S_L)=I_1(N+N_{MIMO})$.

The reward is back-propagated from the terminal state to the initial state $s_0$ and Q values are updated. Back-propagation may be performed according to various methods, including the following three, which may be referred to as option-1, option-2, and option-3. In option-1, which may be referred to as additive back-propagation, Q(s, a) is updated as follows:

$$Q(s,a)\leftarrow Q(s,a)+\Delta \quad (15)$$

In option-2, which may be referred to as max back-propagation, Q(s, a) is updated as follows:

$$Q(s,a)\leftarrow \max(Q(s,a), N(s,a)\times\Delta) \quad (16)$$

In option-3, which may be referred to as max with scaling, Q(s, a) is updated as follows:

$$Q(s, a,)\leftarrow \max\left(Q(s, a)\times\frac{N(s, a)}{N(s, a)-1}, N(s, a)\times\Delta\right) \quad (17)$$

Any of the methods for calculating the terminal reward $\Delta$ may be used with any of the options for back-propagation. The reward computation and back-propagation algorithm is summarized in Listing 2.

Listing 2

1. IF s = terminal state
   a. IF reward option 1
                    $\Delta = 1(\|X\|_F^2 = N)(1+ S_L)$
   b. ELSEIF reward option 2
                    $\Delta = I_1(\|X\|_F^2 + S_L) + I_2$
   c. ENDIF
   d. WHILE s $\neq$ NULL
      i. Find s', a' such that (s', a') → s
      ii. s ← s', a + a'
      iii. N(s,a) = N(s,a) + 1
      iv. IF back-propagation option 1
          Q(s,a) ← Q(s,a) + $\Delta$
      v. ELSEIF back-propagation option 2
          Q(s,a) ← max(Q(s,a), N(s,a) × $\Delta$)
      vi. ELSEIF back-propagation option 3

$$Q(s, a,) \leftarrow \max\left(Q(s, a)\times\frac{N(s, a)}{N(s, a)-1}, N(s, a)\times\Delta\right)$$

vii. ENDIF
   e. ENDWHILE
2. ENDIF

In some embodiments, the Q(s, a) and N(s, a) values generated during the MCTS are used to train the neural network to obtain a network parameter set $\theta$. The input of the network is state s and the output is $\overline{Q}=Q/N$. The normalization (dividing by N) may be employed because states at higher levels in the tree have larger value of Q compared to states close to the terminal state. The normalization may help to ensure that in training each state has equal weight.

Once the training dataset 210 has been generated (e.g., using the MCTS method described above), the values Q(s, a) and N(s, a) may be used for network training, in which a neural network (referred to as a Q-network) is trained to estimate the Q value of each state-action (s, a). Each training sample corresponds to one state s and one of the valid actions $a \in \mathcal{A}$ (s) for that state. The input of the Q-network is constructed from state vector s and action vector a, which are obtained from state s and action a (as discussed in further detail below).

For a state $s_i$, the state vector $s_i$, i=0, 1, 2 . . . , is defined based on $G_i$, $B_i$ and a vector $s_{P_i}$ which indicates which ports remain to be connected. The vector $s_i$ may be expressed as follows $$s_i = \begin{bmatrix} G_i(:) \\ B_i(:) \\ s_{P_i} \end{bmatrix} \quad (18)$$

where $G_i(:)$ and $B_i(:)$ are $N_a M \times 1$ and $ML \times 1$ column vectors. The vector $s_{P_i}$ is defined as $$s_{P_i} = \begin{bmatrix} \text{no. of unconnected } LB \text{ ports in } P_i \\ \text{no. of unconnected } MB1 \text{ ports in } P_i \\ \text{no. of unconnected } MB2 \text{ portsin } P_i \\ \vdots \\ \text{no. of unconnected } NRUM \text{ ports in } P_i \end{bmatrix} \quad (19)$$

Even though state tuple $s_i$ includes $X_i$, $Y_i$, these vectors need not be included in the state vector $s_i$, because $X_i$, $Y_i$ do not include information not present in $G_i$, $B_i$. Therefore, including $G_i$, $B_i$ in $S_i$ is sufficient.

The action vector for action a={n, m, l} is denoted as follows:

$$a = \begin{bmatrix} e_{N_a}(n) \\ e_M(m) \\ e_L(l) \end{bmatrix} \quad (20)$$

where $e_{13}$ (n) is a $N_a \times 1$ vector with nth element=1 and all other elements=0.

In this way, the input to the Q-network is a vector $[s_i^T, a^T]^T$ in order to estimate the Q value for state-action pair $(s_i, a)$. The output of the network is $\overline{Q}(s, a)$. The network may be trained with a quasi-Newton method to obtain the network parameter set θ (e.g., the weights of the neural network). The network may be trained to estimate $\overline{Q}(s, a)$.

When, in operation, a UE receives an allocation of active ports from the network, the Q-network, programmed with (e.g., with a copy of) the network parameter set θ, may perform inference operations to identify a set of connections to be made in the RFIC. For example, the network parameter set θ is used to estimate the $\overline{Q}$ value at given state s and action a. The value of $\overline{Q}$ estimated by the network during inference may be denoted $\hat{\overline{Q}}$ (s, a). This estimated quality value $\hat{\overline{Q}}$ (s, a) may correspond to a likelihood of the second state transition being one of a sequence of transitions terminating in a successful terminal state, e.g., a terminal state in which a connection is made to each of the available active ports. The estimated quality value $\hat{\overline{Q}}$ (s, a) may further correspond to the likelihood that in the terminal state at least one local oscillator is shared, e.g., that in the terminal state two respective connections are made, from a local oscillator to two mixers.

If the network training is ideal such that the action identified by the neural network as the best action is actually the best action, i.e., $$\operatorname*{argmax}_a \hat{\overline{Q}}(s, a) = \operatorname*{argmax}_a \overline{Q}(s, a)$$

for all states s, then the inference time algorithm may be the one shown in Listing 3.

Listing 3

1. Input: $\mathcal{P}$, G, B, C, θ
2. Check feasibility with Algorithm-1. If not feasible, STOP.
3. Initialize: initial state $s_0$
4. State s = $s_0$,
5. WHILE (1)
   a. Get set of valid actions $\mathcal{A}(s)$ for state s.
   b. Run neural network with parameter θ to get $\hat{\overline{Q}}$(s, a), $\forall a \in \mathcal{A}(s)$
   c. Select aution a* with the largest Q-value, $a^* = \arg\max_{a \in A(s)} \hat{\overline{Q}}(s, a)$
   d. Get next state: (s, a*) → s'.
   e. Update: s ← s'
   f. IF s is a leaf node
      i. STOP. //success, all ports connected, all constraints C1-C8 are satisfied
   g. ENDIF
6. ENDWHILE In practice, the network may not predict the best action accurately for all of the states. In that case, the algorithm of Listing 3 may fail to find successful connections, even when successful connections could be made. To increase the likelihood of success, the algorithm of Listing 3 may be modified to explore the tree by taking actions with second-largest or third-largest $\hat{\overline{Q}}$ values. The modified method is described in Listing 4. In this algorithm (as in the algorithm of Listing 3), the UE (e.g., a processing circuit of the UE) may feed, to the neural network (which may also be implemented in the processing circuit), the initial state, and each of the available state transitions from the first state and obtain, from the neural network, a quality value for each of the state transitions. It may then (as it would in the algorithm of Listing 3) repeat the process, at each step (i) advancing to a new state according to the state transition with the highest quality value (as it would in the algorithm of Listing 3), or (ii) if the first terminal state found is not a successful terminal state, then, at one or more states in the sequence of states, advancing to a new state according to the state transition with a lower quality value than highest quality value (e.g., with the second-highest or third-highest quality value). The main aspects of the algorithm include the following:

The algorithm includes an iteration index: i, level: l and action index in the lth level: $k_l$ Selected action at level l=0, 1, 2, . . . is the action with $k_l$th largest $\hat{\overline{Q}}$ $k_l$ is computed as $$k_l = \left\lfloor \frac{\mathrm{mod}(i, 10^{(l+1)})}{10^l} \right\rfloor + 1.$$

Thus, $k_l$=$K_l$th digit in i from the right+1
When i=0, $k_0$=$k_1$=$k_2$= . . . =1
When i=1, $k_0$=2,$k_1$=$k_2$= . . . =1
When i=100, $k_2$=2,$k_0$=$k_1$=$k_3$= . . . =1

The index i is incremented when the algorithm reaches a leaf node, but does not find successful connections.

The algorithm is illustrated in FIGS. 3A-3D (with FIG. 3D being a legend for FIGS. 3A-3C). In FIGS. 3A-3C, for any state, the action on the left-hand side has higher $\hat{\bar{Q}}$ than the action on the right-hand side. FIGS. 3A-3C show a simple state tree for ease of illustration; in some more complex state trees, some of the parent nodes may have more than two child nodes, for example. In FIG. 3A the path (which is the path that would be followed if the algorithm of Listing 3 were used) ends at a terminal node in which not all of the active ports are connected, because at the third level (corresponding to $k_2$) the estimated quality values generated by the neural network are sufficiently in error that $a_1$ is given a higher estimated quality value than $a_2$. When the algorithm of Listing 4 detects that the terminal state does not correspond to a successful set of connections, it begins to try taking the second-best action at each level, one level at a time. FIG. 3B shows that this approach also initially results in failure when the right-hand action is taken at the first level (corresponding to $k_0$), and FIG. 3C shows that this approach results in success when the right-hand action is taken at the third level (corresponding to $k_2$). It may be seen that the algorithm therefore reaches the successful state when the index is i=100. At i=100, the algorithm selects actions corresponding to highest $\hat{\bar{Q}}$ at level 0, 1, 3, and 4, while it selects action corresponding to the second highest $\hat{\bar{Q}}$ at level 2. Once a successful set of connections has been found, the UE may cause those connections to be made, in the RFIC (e.g., by writing corresponding values to registers in the RFIC, resulting in the closing of RF switches, in the RFIC, to make the connections found by the algorithm).

Listing 4

Figure 4:
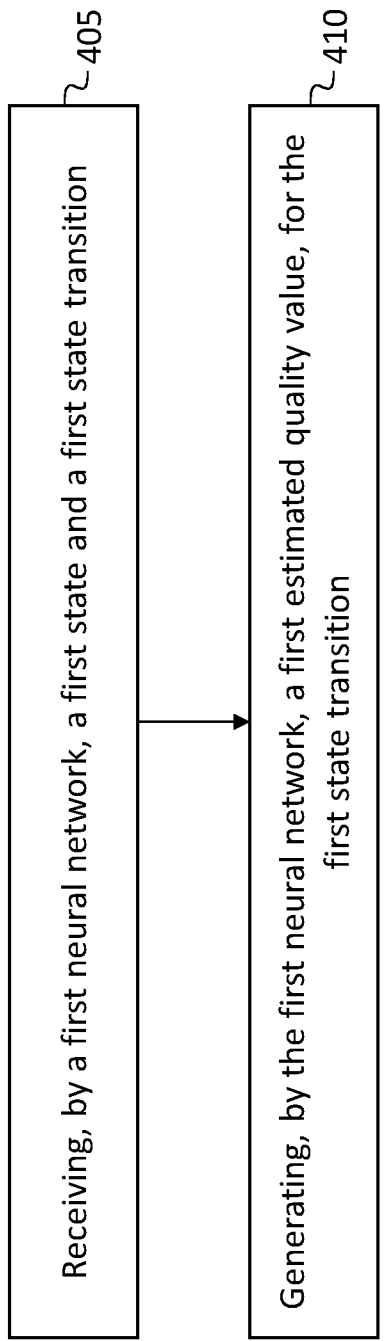
FIG. 4 is a flowchart, according to an embodiment of the present disclosure.
Figure 5:
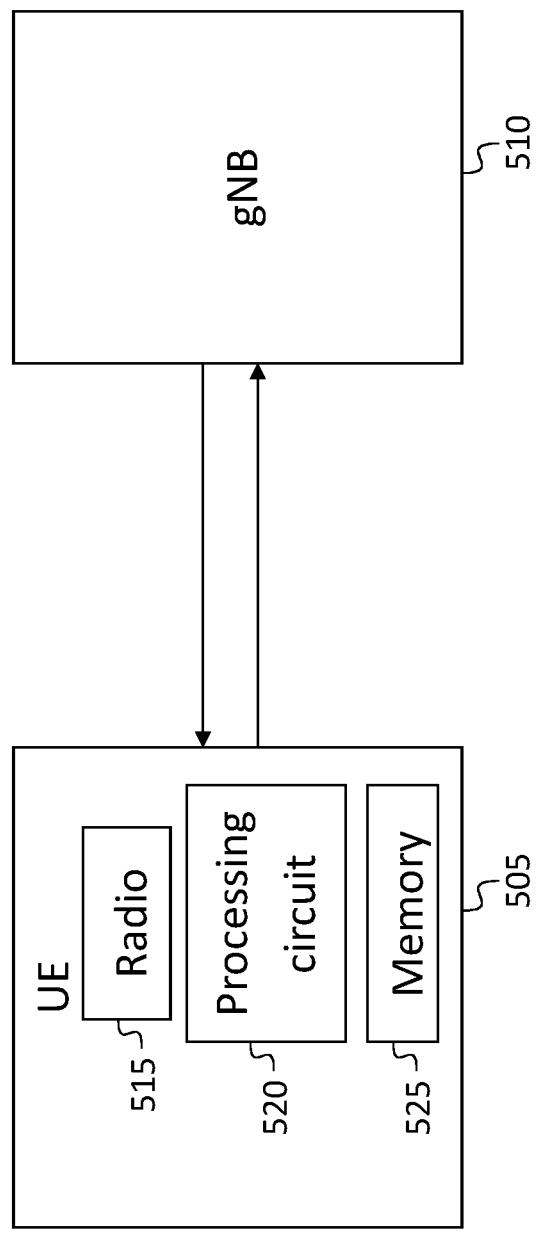
FIG. 5 is a block diagram of a system for wireless communications, according to an embodiment of the present disclosure.

1. Input: $\mathcal{P}$, G, B, θ
2. Check feasibility with Algorithm-1. If not feasible, STOP.
3. Initialize: initial state so, initial loop index $i_0 = 0$, maximum loop index: $i_{max} = 199$
4. FOR i = $i_0$:$i_{max}$
   a. State s = $s_0$, l = 0,
   b. WHILE (1)
     i. Calculate action index in level l: $k_l = \left\lfloor \frac{\mathrm{mod}(i, 10^{(l+1)})}{10^l} \right\rfloor + 1$
     ii. Get set of valid actions A for state s.
     iii. IF $k_l$ > no. of valid actions
         Break;
     iv. ENDIF
     v. Run neural network with parameter θ to get $\hat{\bar{Q}}$(s, a), ∀a ∈ A
     vi. Select action a* with $k_l$-th largest Q-value.
     vii. Get next state: (s, a*) → s'.
     viii. Update: s ← s', l ← l + 1,
     ix. IF s is a leaf node
         Break;
     x. ENDIF
   c. ENDWHILE
   d. Check connection validity (check all constraints C1-C8 are satisfied)
   e. IF all ports have valid connection in s
     i. STOP (success)
   f. ENDIF
5. ENDFOR FIG. 4 shows a flowchart of a method. In some embodiments, the method includes receiving, at 405, by a first neural network, a first state and a first state transition, the first state comprising: one or more identifiers for available active ports, and a set of available connections between two or more elements, each of the elements being an active port or a mixer or a local oscillator; and generating, at 410, by the first neural network, a first estimated quality value, for the first state transition, the first estimated quality value corresponding to a likelihood of the first state transition being one of a sequence of transitions terminating in a terminal state in which a connection is made to each of the available active ports, wherein: the first state transition is a transition from the first state to a second state, and the second state includes a connection, not present in the first state, between two of the elements. FIG. 5 shows a system including a UE 505 and a gNB 510, in communication with each other. The UE may include a radio 515 and a processing circuit (or a means for processing) 520, which may include or be connected to a memory 525, and which may perform various methods disclosed herein, e.g., the method illustrated in FIG. 4. For example, the processing circuit 520 may receive, via the radio 515, transmissions from the network node (gNB) 510, and the processing circuit 520 may transmit, via the radio 515, signals to the gNB 510.

In some examples of embodiments described herein, mixers are connected to local oscillators and to available active ports, but the present disclosure is not limited to such circuits. For example, in some embodiments, connections between circuit elements are selected, each of the circuit elements being (1) a first circuit type, (2) a second circuit type that operatively connects an element of the first circuit type to one of the available active ports, and (3) the available active ports, where the first circuit type may be, but is not limited to being, a local oscillator, and the second circuit type may be, but is not limited to being, a mixer.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X−Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, the term "array" refers to an ordered set of numbers regardless of how stored (e.g., whether stored in consecutive memory locations, or in a linked list). As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1-35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for configuring an RF network based on machine learning have been specifically described and illustrated herein, many modifications and variations will be apparent to those skilled in the art. Accordingly, it is to be understood that a system and method for configuring an RF network based on machine learning constructed according to principles of this disclosure may be embodied other than as specifically described herein. The invention is also defined in the following claims, and equivalents thereof.

What is claimed is:

1. A method, comprising:
receiving, by a first neural network, a first state and a first state transition, the first state comprising:
one or more identifiers for available active ports, and
a set of available connections between two or more circuit elements, each of the circuit elements being one of: (1) a first circuit type, (2) a second circuit type that operatively connects a circuit element of the first circuit type to one of the available active ports, and (3) the available active ports; and
generating, by the first neural network, a first estimated quality value, for the first state transition, the first estimated quality value corresponding to a likelihood of the first state transition being one of a sequence of transitions terminating in a terminal state in which a connection is made to each of the available active ports,
wherein:
the first state transition is a transition from the first state to a second state, and
the second state includes a connection, not present in the first state, between two of the circuit elements.

2. The method of claim 1, further comprising:
feeding, to the first neural network, the first state and the first state transition;
receiving, from the first neural network, the first estimated quality value;
feeding, to the first neural network, the first state and a second state transition; and
receiving from the first neural network, a second estimated quality value, the second estimated quality value corresponding to a likelihood of the second state transition being one of a sequence of transitions terminating in a terminal state in which a connection is made to each of the available active ports,
wherein the second state transition is a transition from the first state to a third state, the third state including a connection, not present in the first state, and not present in the second state, between two of the circuit elements.

3. The method of claim 2, further comprising determining that the second estimated quality value is greater than the first estimated quality value.

4. The method of claim 3, further comprising, in response to determining that the second estimated quality value is greater than the first estimated quality value, feeding to the first neural network, the third state and a third state transition, wherein the third state transition is a transition from the third state to a fourth state, the fourth state including a connection, not present in the third state, between two of the circuit elements.

5. The method of claim 4, further comprising feeding to the first neural network, the second state and a fourth state transition,
wherein:
the fourth state transition is a transition from the second state to a fifth state, and
the fifth state includes a connection, not present in the second state, between two of the circuit elements.

6. The method of claim 1, wherein the first circuit type is a local oscillator and the second circuit type is a mixer, and wherein the first estimated quality value further corresponds to a likelihood of the first state transition being one of a sequence of transitions terminating in a terminal state in which a connection is made to each of the available active ports and in which two respective connections are made, from a local oscillator to two mixers.

7. The method of claim 1, further comprising performing a feasibility test, to check for an indication that no terminal state in which a connection is made to each of the available active ports can be reached from the first state.

8. The method of claim 7, wherein a number of circuit elements of the first circuit type are available and a number of circuit elements of the second circuit type are available, and the feasibility test is based on the number of available circuit elements of the first circuit type and the number of available circuit elements of the second circuit type.

9. The method of claim 1, further comprising:
generating a training data set using a Monte-Carlo tree search to assign a quality value to each of a plurality of combinations of states and state transitions;
training a training neural network using the training data set, to generate a network parameter set; and
storing the network parameter set in the first neural network.

10. A User Equipment, comprising:
a processing circuit; and
memory connected to the processing circuit,
the memory storing instructions that, when executed by the processing circuit, cause the User Equipment to perform a method, the method comprising:
receiving, by a first neural network, a first state and a first state transition, the first state comprising:
one or more identifiers for available active ports, and
a set of available connections between two or more circuit elements, each of the circuit elements being one of: (1) a first circuit type, (2) a second circuit type that operatively connects a circuit element of the first circuit type to one of the available active ports, and (3) the available active ports; and
generating, by the first neural network, a first estimated quality value, for the first state transition, the first estimated quality value corresponding to a likelihood of the first state transition being one of a sequence of transitions terminating in a terminal state in which a connection is made to each of the available active ports,
wherein:
the first state transition is a transition from the first state to a second state, and
the second state includes a connection, not present in the first state, between two of the circuit elements.

11. The User Equipment of claim 10, wherein the method further comprises:
feeding, to the first neural network, the first state and the first state transition;
receiving, from the first neural network, the first estimated quality value;
feeding, to the first neural network, the first state and a second state transition; and
receiving from the first neural network, a second estimated quality value, the second estimated quality value corresponding to a likelihood of the second state transition being one of a sequence of transitions terminating in a terminal state in which a connection is made to each of the available active ports,
wherein the second state transition is a transition from the first state to a third state, the third state including a connection, not present in the first state, and not present in the second state, between two of the circuit elements.

12. The User Equipment of claim 11, wherein the method further comprises determining that the second estimated quality value is greater than the first estimated quality value.

13. The User Equipment of claim 12, wherein the method further comprises, in response to determining that the second estimated quality value is greater than the first estimated quality value, feeding to the first neural network, the third state and a third state transition, wherein the third state transition is a transition from the third state to a fourth state, the fourth state including a connection, not present in the third state, between two of the circuit elements.

14. The User Equipment of claim 13, wherein the method further comprises feeding to the first neural network, the second state and a fourth state transition,
wherein:
the fourth state transition is a transition from the second state to a fifth state, and
the fifth state includes a connection, not present in the second state, between two of the circuit elements.

15. The User Equipment of claim 10, wherein the first circuit type is a local oscillator and the second circuit type is a mixer, and wherein the first estimated quality value further corresponds to a likelihood of the first state transition being one of a sequence of transitions terminating in a terminal state in which a connection is made to each of the available active ports and in which two respective connections are made, from a local oscillator to two mixers.

16. The User Equipment of claim 10, wherein the method further comprises performing a feasibility test, to check for an indication that no terminal state in which a connection is made to each of the available active ports can be reached from the first state.

17. The User Equipment of claim 16, wherein a number of circuit elements of the first circuit type are available and a number of circuit elements of the second circuit type are available, and the feasibility test is based on the number of available circuit elements of the first circuit type and the number of available circuit elements of the second circuit type.

18. The User Equipment of claim 10, wherein the method further comprises:
generating a training data set using a Monte-Carlo tree search to assign a quality value to each of a plurality of combinations of states and state transitions;
training a training neural network using the training data set, to generate a network parameter set; and
storing the network parameter set in the first neural network.

19. A User Equipment, comprising:
means for processing; and
memory connected to the means for processing,
the memory storing instructions that, when executed by the means for processing, cause the User Equipment to perform a method, the method comprising:
receiving, by a first neural network, a first state and a first state transition, the first state comprising:
one or more identifiers for available active ports, and
a set of available connections between two or more circuit elements, each of the circuit elements being one of: (1) a first circuit type, (2) a second circuit type that operatively connects a circuit element of the first circuit type to one of the available active ports, and (3) the available active ports; and
generating, by the first neural network, a first estimated quality value, for the first state transition, the first estimated quality value corresponding to a likelihood of the first state transition being one of a sequence of transitions terminating in a terminal state in which a connection is made to each of the available active ports,
wherein:
the first state transition is a transition from the first state to a second state, and
the second state includes a connection, not present in the first state, between two of the circuit elements.

20. The User Equipment of claim 19, wherein the method further comprises:
feeding, to the first neural network, the first state and the first state transition;
receiving, from the first neural network, the first estimated quality value;
feeding, to the first neural network, the first state and a second state transition; and
receiving from the first neural network, a second estimated quality value, the second estimated quality value corresponding to a likelihood of the second state transition being one of a sequence of transitions terminating in a terminal state in which a connection is made to each of the available active ports,
wherein the second state transition is a transition from the first state to a third state, the third state including a connection, not present in the first state, and not present in the second state, between two of the circuit elements.

\* \* \* \* \*